US006658113B1

(12) United States Patent
Poulsen et al.

(10) Patent No.: US 6,658,113 B1
(45) Date of Patent: *Dec. 2, 2003

(54) APPARATUS AND METHOD FOR CONCEALING DATA BURSTS IN AN ANALOG SCRAMBLER USING AUDIO REPETITION

(75) Inventors: Steven P. Poulsen, Lincoln, NE (US); James P. Preston, II, Lincoln, NE (US)

(73) Assignee: Transcrypt International, Inc., Lincoln, NE (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/972,937

(22) Filed: Nov. 18, 1997

(51) Int. Cl.[7] ............................ H04K 1/00; H04L 9/00
(52) U.S. Cl. ...................................................... 380/276
(58) Field of Search .................................... 380/276, 43

(56) References Cited

U.S. PATENT DOCUMENTS 3,824,467 A 7/1974 French
3,878,473 A 4/1975 Furtney, Jr.
4,288,868 A 9/1981 Grotjohann et al.
4,317,196 A 2/1982 Ulug
4,392,021 A 7/1983 Slate
4,512,013 A 4/1985 Nash et al.
4,523,311 A 6/1985 Lee et al.
4,528,659 A 7/1985 Jones, Jr.
4,646,289 A 2/1987 Tsiakas et al.
4,672,605 A 6/1987 Hustig et al.
4,757,536 A 7/1988 Szczutkowski et al.
4,807,248 A 2/1989 Pyatt et al.
4,811,394 A 3/1989 Ragavan et al.
4,817,142 A 3/1989 Van Rassel
4,856,063 A 8/1989 McCalmont
4,903,279 A 2/1990 Murakami et al.
4,937,867 A 6/1990 Kasparian et al.
5,029,340 A 7/1991 Hashimoto
5,278,907 A 1/1994 Snyder et al.
5,283,831 A 2/1994 Cook et al.
5,287,384 A 2/1994 Avery et al.
5,297,162 A 3/1994 Lee et al.
5,351,300 A 9/1994 Quisquater et al.
5,400,368 A 3/1995 Cheng et al.
5,459,524 A 10/1995 Cooper
5,553,079 A 9/1996 Niki et al.
5,557,048 A 9/1996 Koike et al.
5,802,076 A * 9/1998 Weigand et al. ............ 714/747
5,867,806 A * 2/1999 Strickland et al. ............. 702/7
6,078,668 A * 6/2000 Poulsen ...................... 380/274

FOREIGN PATENT DOCUMENTS

JP 57-113647 A 7/1982

* cited by examiner

*Primary Examiner*—Gilberto Barrón
*Assistant Examiner*—Douglas Meislahn
(74) *Attorney, Agent, or Firm*—McKee, Voorhees & Sease, P.L.C.

(57) ABSTRACT

An apparatus and method for concealing data bursts in an analog scrambler using parts of the audio of a signal in substitution for the data bursts. What otherwise would be periodic data bursts appearing at the audio output are replaced with selected portions from audio portions of the multiplexed signal. Preferably the replaced audio samples come from immediately past and immediately future portions of the audio of the signal. The data bursts are therefore effectively concealed from the audio output which improves on the degradation of audio otherwise caused by the data bursts that are mixed in periodically with the audio portions of the signal.

14 Claims, 4 Drawing Sheets

APPARATUS AND METHOD FOR CONCEALING DATA BURSTS IN AN ANALOG SCRAMBLER USING AUDIO REPETITION

BACKGROUND OF THE INVENTION

A. Field of the Invention

The present invention relates to audio communication transmissions, and in particular, to such transmissions wherein data bursts are contained within the transmissions, and more particularly, to an apparatus and method to improve on the audio quality of such transmissions.

B. Problems in the Art

In co-pending, co-owned U.S. Ser. No. 08/689,397, filed Aug. 7, 1996, the concerns about improving audio quality of voice communications that include bursts of digital data (e.g. synchronization data) are set out and a proposed solution is disclosed. The bursts of audio are concealed by replacing the data bursts with, for example, a piece of immediately preceding audio. Essentially, a small part of the audio is replayed during the period a data burst would otherwise exist in the audio signal.

Thus, instead of the pops, snaps, and crackles that would be heard if the data bursts were not removed and were played through with the audio, and which at best are annoying and at worst degrade the audio to a point where critical audio is lost, a more natural or smoother audio is achieved.

However, there is still room for improvement in the audio output. The insertion of a section of audio in place of the data bursts puts audio (e.g. voice) in those locations, but the audio can at times have a stuttering effect because of this play back. Even though the length of a data burst is relatively short, it can be long enough to cover critical letter or syllabic information. Thus the repetition or play back of a preceding segment of voice, for example, can create a stuttering sound that is distracting or which degrades the quality of the audio noticeably. It is therefore the principal object of the present invention to further improve the audio output over that disclosed in U.S. Ser. No. 08/689,397 and the state of the art.

Furthermore it is the object of the present invention to provide an apparatus and method for concealing data bursts in an analog scrambler:

A. which conceals the data bursts by repeating audio taken from audio portions immediately prior to and immediately after each corresponding data burst of the transmission;

B. which conceals the data bursts in a manner which reduces distracting. audio effects;

C. which improves the sound quality of the audio to a listener;

D. which is adjustable for various sizes and types of data bursts;

F. which is implementable in several fashions, including with a digital signal processor; and G. which is economical, efficient and durable in use.

These and other objects, features, and advantages of the present invention will become more apparent with reference to the accompanying specification and claims.

SUMMARY OF THE INVENTION

The invention includes a method of concealing data bursts in a transmitted time multiplexed signal, comprising periods of scrambled audio and periods of data bursts, by replacing at an audio output the data bursts with audio taken from the audio portions of the transmitted time multiplexed signal immediately prior to and immediately after each data burst. In one aspect of the invention, the replacement of the data bursts is accomplished by storing immediate past and immediate future audio samples from the signal and playing back those audio samples during receipt of a data burst. The replay of sampled audio is correlated to the length of a data burst.

The apparatus according to the present invention utilizes storage buffers that contain audio samples of immediate past and immediate future audio portions of the signal relative to each data burst, switching devices, and a control device to allow the audio portions of the signal to pass through the switching devices to an audio output, but changing states to pass stored audio samples to the audio output at those times when a data burst otherwise would be present at the audio output. The data bursts in the signal are therefore effectively concealed.

DETAILED DESCRIPTION OF THE PREFERRED EMBODIMENT

Figure 1:
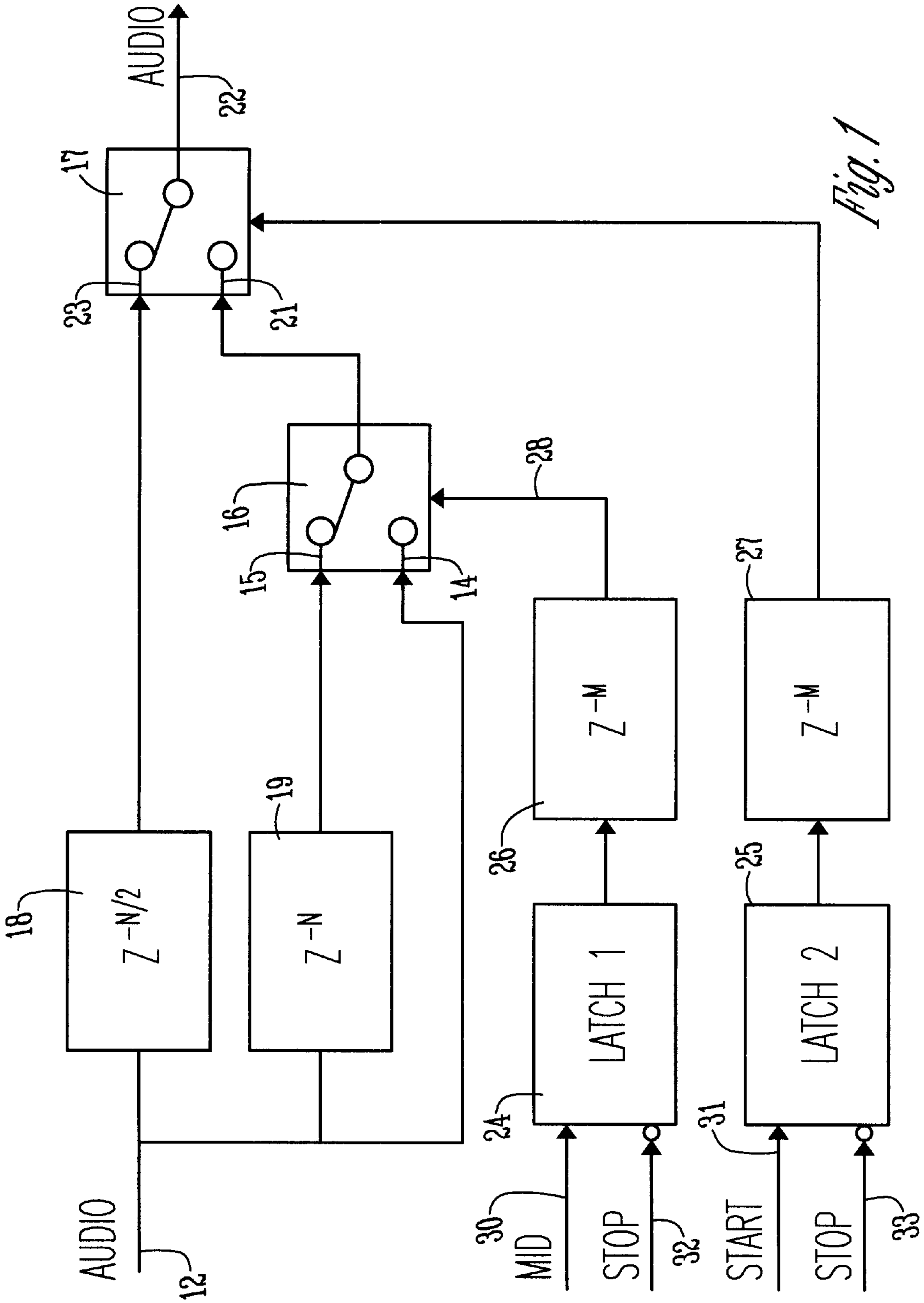
FIG. 1 is a schematic representation of an embodiment according to the present invention.

To better understand the invention, one embodiment thereof will now be described in detail. Frequent reference will be taken to the drawings. Reference numerals are used to indicate certain parts and locations in the drawings. The same reference numerals will be used to indicate the same parts and locations throughout the drawings in this description, unless otherwise indicated.

U.S. Ser. No. 08/689,397 can be consulted and its disclosure is incorporated by reference herein for background regarding the invention and this preferred embodiment.

FIG. 1 illustrates schematically an apparatus according to the present invention. In this embodiment, an audio input 12 receives a signal of the type diagrammatically depicted at reference numeral 50 in FIG. 3. In this embodiment, signal 50 is a time-division multiplexed (TDM) signal consisting of audio portions (see reference numerals 62 in FIG. 3) with periodically interspersed data bursts (reference numeral 64 in FIG. 3). Portions 62 are time varying analog waves representative of audio or speech. Portion 64 represents an analog carrier wave with modulated digital information contained therein.

As can be seen in FIG. 1, TDM signal 50 enters audio input 12 and passes to three locations. First to a first input 14 of a first switch device 16. Second to the input of what will be called first storage buffer 18. Third, to the input of what will be called second storage buffer 19. It is to be understood that first buffer 18 stores signal 50 in a fashion whereby signal 50 is delayed by the equivalent length of time equal to N/2 samples. The quantity N will be defined later. Buffer 19 delays original signal 50 by N samples.

Therefore, at any given time, the system has the ability to select from signal 50, or signal 50 delayed by N/2 samples, or signal 50 delayed by N samples. The data bursts 64 are replaced with cut and pasted portions of non-data burst audio by switching between the three signals, again identical in content, but shifted in time relative to one another.

The output of storage buffer 18 appears at a first input 23 of a second switch device 17. The output of storage buffer 19 appears at second input 15 to switch 16. The output 22 of switch 16 is connected to the second input 21 to second switch 17.

The output 22 of second switch 17 is directed to an audio processing circuit which converts the analog audio waveform in a manner that can then be output to a acoustic speaker.

FIG. 1 also shows that a first latch 24 has an output connected to what will be called time-delay device 26, which has an output 28 which is connected to and controls the state of first switch 16. Latch 24 is controlled by mid line 30 and stop line 32. A second latch 25 has an output connected to what will be called time-delay device 27, which has an output which is connected to and controls the state of second switch 17. Latch 25 is controlled by start and stop lines 31 and 33.

Latch 24 and time-delay 26, latch 25 and time-delay control 27, and switches 16 and 17 control whether multiplexed signal 50 is passed to output 22, or whether the output of buffer 18 or buffer 19 is passed to output 22 at any given time.

Operation of the embodiment of FIG. 1 is as follows. Multiplexed signal 50 is essentially an audio signal mixed with periodic data bursts 64 and is presented as an input signal at audio input 12 in FIG. 1. As stated above, this signal 50 is fed to first input 14 of switch 16. As illustrated in FIG. 1, signal 50 which has been delayed by N/2 sample times is iterated through storage buffer 18 in chunks which are N samples in length, and signal 50 which has been delayed by N sample times is iterated through storage buffer 19 which is also N samples in length. In other words, at any moment in time, a sample from buffer 18 would be N/2 samples times behind signal 50, and a sample from buffer 19 would be N sample times behind signal 50 and N/2 sample times behind buffer 18 (See FIG. 3 at 50, 52, and 53).

It is to be understood that in the preferred embodiment the N samples correspond to the number of samples required to completely fill a time period which is slightly longer than a data burst 64. In the preferred embodiment N samples corresponds to the number of samples required to completely fill 37.5 milliseconds (ms) which is 1.5 ms longer than the data to be removed (a data burst 64).

The present invention operates at a sampling rate of 8 Khz. Therefore the value N can be calculated according to the following equation.

$$N=8{,}000\cdot\text{samples}/s\cdot 37.5\cdot\text{ms}=300$$

Thus, in one embodiment of the invention, the buffer is 300 samples in length.

Audio output 22 has essentially three options, depending on the state of switches 16 and 17. One option is audio 12 (multiplexed signal 50). Another option is the contents of buffer 18, which trails signal 50 by N/2 sample times. The third option is the contents of buffer 19, which trails signal 50 by N sample times. As can be understood by the following description, the components cooperate in function and timing to substitute pieces of audio taken from immediately prior to and immediately after a data burst 64, to replace the data burst and reproduce signal 50 at output 22 without the data burst.

The first option described above simply sends undelayed signal 50 to output 22. To create the first option, switches 16 and 17 connect respective inputs 14 and 21 to their outputs. The signal path is therefore directly between input 12 and output 22 of FIG. 1. In this case, switches 16 and 17 are set to positions opposite from what is shown in FIG. 1, and will be referred to as "open".

To create the second option, switch 17 connects input 23 to its output 22. The state of switch 16 is therefore irrelevant because it is non-conducting at the unselected input 21 of switch 17. During the second option, the contents of buffer 18 is sent to output 22. Switch 17 is in what will be called the "default" position, where first input 23 of switch 17 is driven by buffer 18. Switch 17 is activated through start and stop lines 31 and 33. These lines pass through latch 25 which latches the output high when a positive-going pulse is detected on start. When a positive-going pulse is present on receipt of the stop instruction, latch 25 resets its output to the low state.

The output of latch 25 is sent through a delay device 27 of M samples in length. This allows the device controlling start and stop lines 31 and 33 to not be synchronized to the actual audio. It is to be understood that this operation assumes that the audio will arrive at the controlling unit to the start and stop lines 31 and 33 before it is present on the audio input 12 of FIG. 1.

The value of M can be set experimentally or it can be computed by evaluating the system delays, such as can be accomplished by one skilled in the art. An alternate method consists of a separate delay on start and stop lines 31 and 33 as opposed to one delay on the output of latch 25. This allows what can be called the "replay window" to be widened to be larger than the actual data pulse width.

To create the third option for output 22, switch 17 is moved from its default to its on position so that its second input 21 is driven by switch 16. Also switch 16 remains in its default position so that its first input 15 is driven by buffer 19. Switch 16 is activated through a stop line and a "mid" line, which is set halfway between the start and stop lines (See FIG. 3 at 55). The latch 24 and delay 26 operate in the same way as latch 25 and delay 27.

Figure 2:
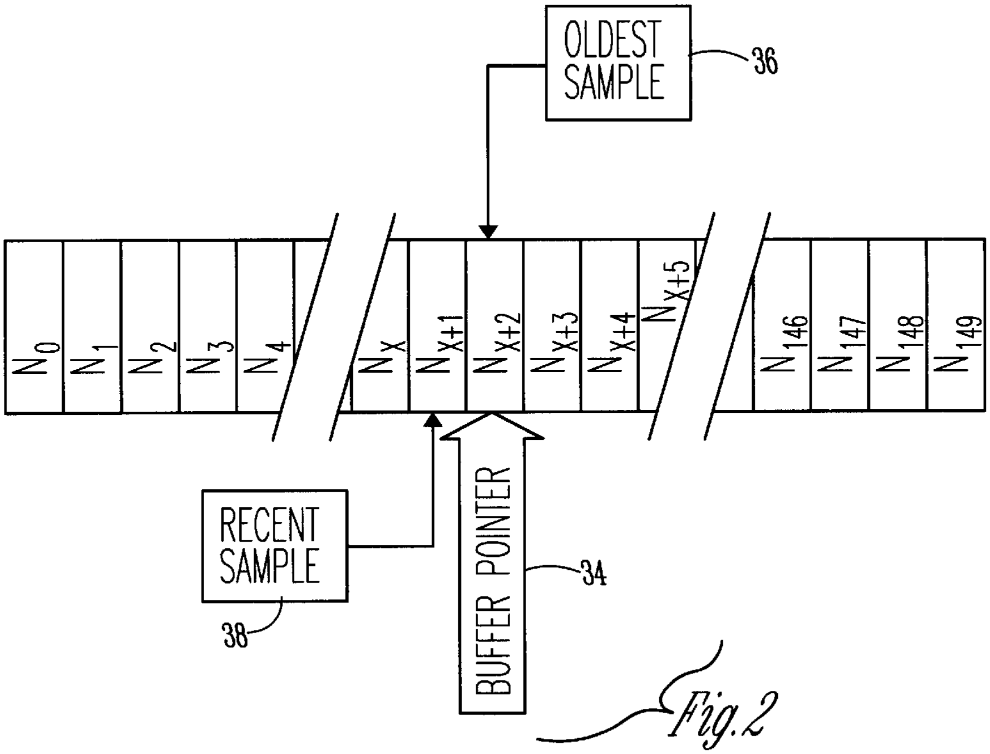
FIG. 2 is a diagrammatic representation of a storage buffer such as could be used with the embodiment of FIG. 1.

To assist in understanding operation of delay buffers 18 and 19, reference can be taken to FIG. 2. In the preferred embodiment, buffer 18 is 150 samples long and has an associated pointer 34. Pointer 34 points to the location in the storage buffer that the next audio input sample will be stored. Buffer 18 gets its output from the current location of pointer 34 just before it is overwritten by the next input sample. This output is referred to as the "oldest sample" 36, or the [N-149] sample.

Thus the output is the oldest sample or the [N-149] sample. Once the sample is stored, pointer 34 is advanced one sample position. This means that the location just before pointer 34 contains what is called the most "recent sample" 38.

Buffer 19 is the same as buffer 18 except that it is 300 samples long. Therefore, by utilizing a sampling procedure of the analog multiplexed signal, buffers 18 and 19 continuously refresh themselves with the most recent audio sample and purge themselves of the oldest audio sample, in the context of the finite length of N/2 samples and N samples in length respectively. As will become apparent, buffer 18 is only N/2 samples long because it only has to delay signal 50 by N/2 samples, whereas buffer 19 must delay signal 50 by N samples.

Figure 3:
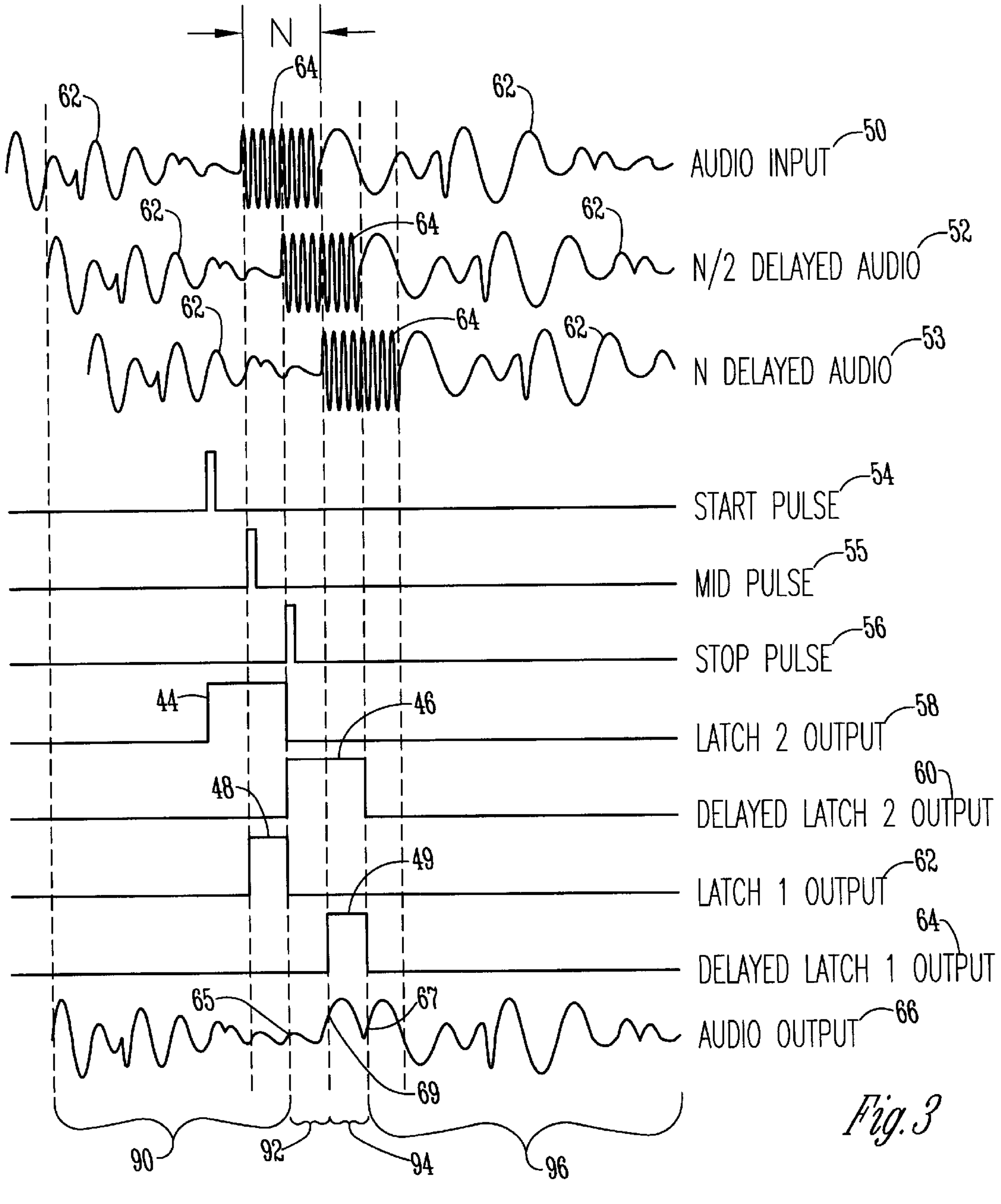
FIG. 3 is a diagrammatic representation of signals at various points in the operation of the embodiment of FIG. 1.

By referring specifically to FIG. 3, a timing diagram for FIG. 1 is shown and illustrates how data bursts 64 are replaced with portions of the audio from signal 50. As previously mentioned, the time-divided multiplexed waveform 50 at the top of FIG. 3 is what is received at audio input 12 of FIG. 1, and the outputs 52 and 53 of buffers 18 and 19 are just delayed versions of signal 50. These delays are for a period of time generally equivalent to the time of N/2 and N samples respectively, and are related to the characteristics of storage buffers 18 and 19 in the process of storing samples in buffers 18 and 19. By appropriate selection, the delays can be increased or decreased according to need or desire. Thus the top three signals of FIG. 3 graphically illustrate the availability of three versions of signal 50 at any given time, each which is shifted in time relative to one another.

FIG. 3 next illustrates how control lines 30, 31, 32, 33, latches 24 and 25, and time delays 26 and 27, control switches 16 and 17 to place certain parts of the three signals 50, 52, and 53 at output 22 at different points of time.

It should be noted that start pulse 54, mid pulse 55 and stop pulse 56 that appear at mid, stop, start and stop lines 31, 33, 30 and 32 of FIG. 1, are earlier in time than the actual data bursts 64 in signal 50. Latch 25 generates a pulse signal 58 from start and stop pulses 54 and 56 based on the leading edge of those pulses. Note that start pulse 54 is approximately N/2 samples ahead of data burst 64 in signal 50 and a full N samples ahead of N/2 delayed signal 52 of buffer 18. Pulse-delay device 27 serves to shift pulse 44 in latch output signal 58 M sample lengths, or so that it generally corresponds and lasts the entire period of data burst 64 in N/2 delayed signal 54. The resulting shifted pulse 46 of delayed latch output signal 60 controls switch 17. Prior to pulse 46 of signal 60, switch 17 would remain in its default state, and would pass signal 52 (signal 50 time-delayed by N/2 ) to audio output 22. It is important to note that in its normal state, when data bursts 64 are not being replaced with chunks of audio, it is N/2 time delayed signal 52 that is passed to audio output, not original signal 50. That is, audio comes from the output of storage buffer 18 (in other words, the delayed input signal 52 of FIG. 3) not from audio input 12. See the portion of the ultimate output signal shown at reference number 90 at the bottom of FIG. 3.

When pulse 46 is generated, switch 17 turns "on" but switch 16 stays in default position. As such, the then contents of buffer 19 are passed to audio output 22. Because buffer 19 lags buffer 18 by N/2 samples, it essentially replays the immediate preceding N/2 samples of the output of buffer 18. Thus, as shown at 92 in FIG. 3, the next N/2 samples after portion 90 will be a repeat of the previous N/2 samples (see reference numeral 92). This essentially covers up or replaces approximately one-half of what otherwise would a data burst 64 in signal 52.

As can be seen in FIG. 3, latch 26 output (signal 62), is N/2 samples in length and is time-shifted by M samples so that it essentially lines up with the last one-half of data burst 64 of signal 52. This is accomplished by beginning pulse 48 at the midpoint of pulse 44 and then delaying it the same M samples (see reference numeral 49) as pulse 44 was delayed.

Pulse 49 controls the state of switch 16 by changing it from its default position (where it is driven by buffer 19) to an "on" position, where it passes original signal 50. Because pulse 49 is in the second half of data burst 64 of signal 52, the essentially N/2. samples of audio immediately succeeding data burst 64 in signal 50 are passed to audio output 22 (see reference numeral 94 in FIG. 3), and what otherwise would be a disruptive second half of data burst 64 in N/2 time delayed signal 52, is now completely replaced with audio (See parts 90, 92, 94, 96 of signal 66).

After pulse 49, switches 16 and 17 revert to default positions, and the signal to audio output 22 is again N/2 time delayed signal 52 (see reference numeral 96 in FIG. 3). Note that during data burst 64 of signal 52, switch 17 is "on" the full time and switch 16 is on the last half of that time, and audio comes first from N time delayed signal 53 (for the first half pulse 46), and then from undelayed signal 50 (for the last one half of pulse 46 as well as the whole duration of pulse 49). Therefore, what otherwise would have been data burst 64 of signal 52 is replaced by a replay of the immediate past audio of signal 52 (cut and pasted from signal 53) and by a premature play of the immediate succeeding audio of signal 52 (cut and pasted from signal 50). The audio at other times comes from signal 52 of FIG. 3. The resultant audio output on output 22 of switch 17 is shown by signal 66 in FIG. 3. Discontinuities 65, 67 and 69 near the transitions of the replayed portions 92 and 94 of audio output 66 can be smoothed with an optional low-pass filter (not shown). Lengthening of the window defined by pulses 46 and 49 of the delayed output devices 26 and 27 can be performed, as discussed earlier, so that there is some tolerable error in the location of data burst 64 relative to delayed latch output pulses 46 and 49.

Figure 4:
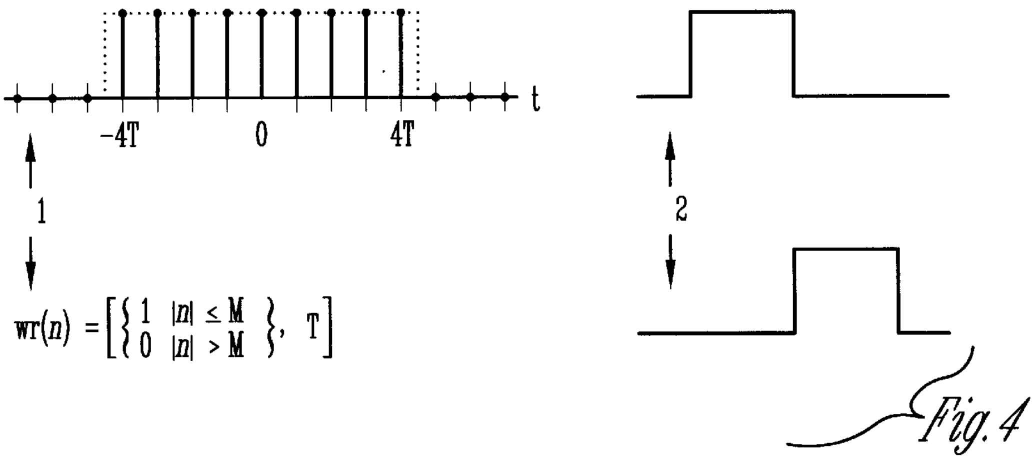
FIGS. 4 and 5 are examples of several weighting functions that can be used to smooth out the audio.
Figure 5:
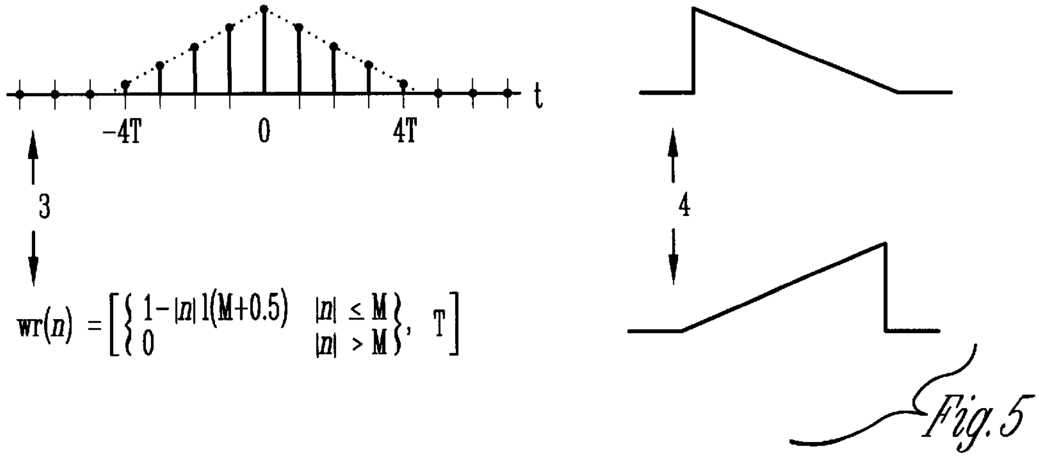

Any discontinuities in the audio output can be smoothed with the use of a weighting function. The weighting function can be derived from any standard windowing function (Fourier window) well known to those skilled in the art, such as for example the triangular (Bartlett) window, the raised cosine (Hanning) window, or the Hamming window. The most basic weighting function is derived from the rectangular window, and is the function used in FIG. 3. The rectangular window and the weighting functions derived from it are shown in FIG. 4. The rectangular window does not smooth the discontinuities. Another possible window, the Bartlett window, and its weighting functions are also shown in FIG. 5. The Bartlett window smoothes the discontinuities between the "past" and "future" replacements.

As can be seen in FIG. 3 at audio output 66, replayed audio segment 92 and pre-played audio segment 94 are essentially identical reproductions of the immediately preceding and immediately succeeding portions of the signal. Stated a different way, when combined, portions 92 and 94 are intentionally selected to be slightly longer in length than data pulse 64 of signal 52, and thereby conceal the data pulse 64 in the audio output 66. Furthermore, by dividing the time otherwise taken by burst 64 and by replacing one-half with audio portion 92 repeating the immediate preceding audio, and replacing the other one-half with audio portion 94 pre-playing the immediate succeeding audio, better audio reproduction can occur at the receiver. Instead of a whole N-samples-in-length audio replay like described in U.S. Ser. No. 08/689,397, which can degrade the audio somewhat, N/2 duplications of the real audio make the audio reproduced of better quality.

The included preferred embodiment is given by way of example only, and not by way of limitation to the invention, which is solely described by the claims herein. Variations obvious to one skilled in the art will be included within the invention defined by the claims.

For example, the operation of the various components diagrammatically depicted in FIG. 1 can be implemented in hardware, firmware, or substantially in software. As previously mentioned, a significant amount of the operation can be implemented in a digital signal processor.

Figure 6:
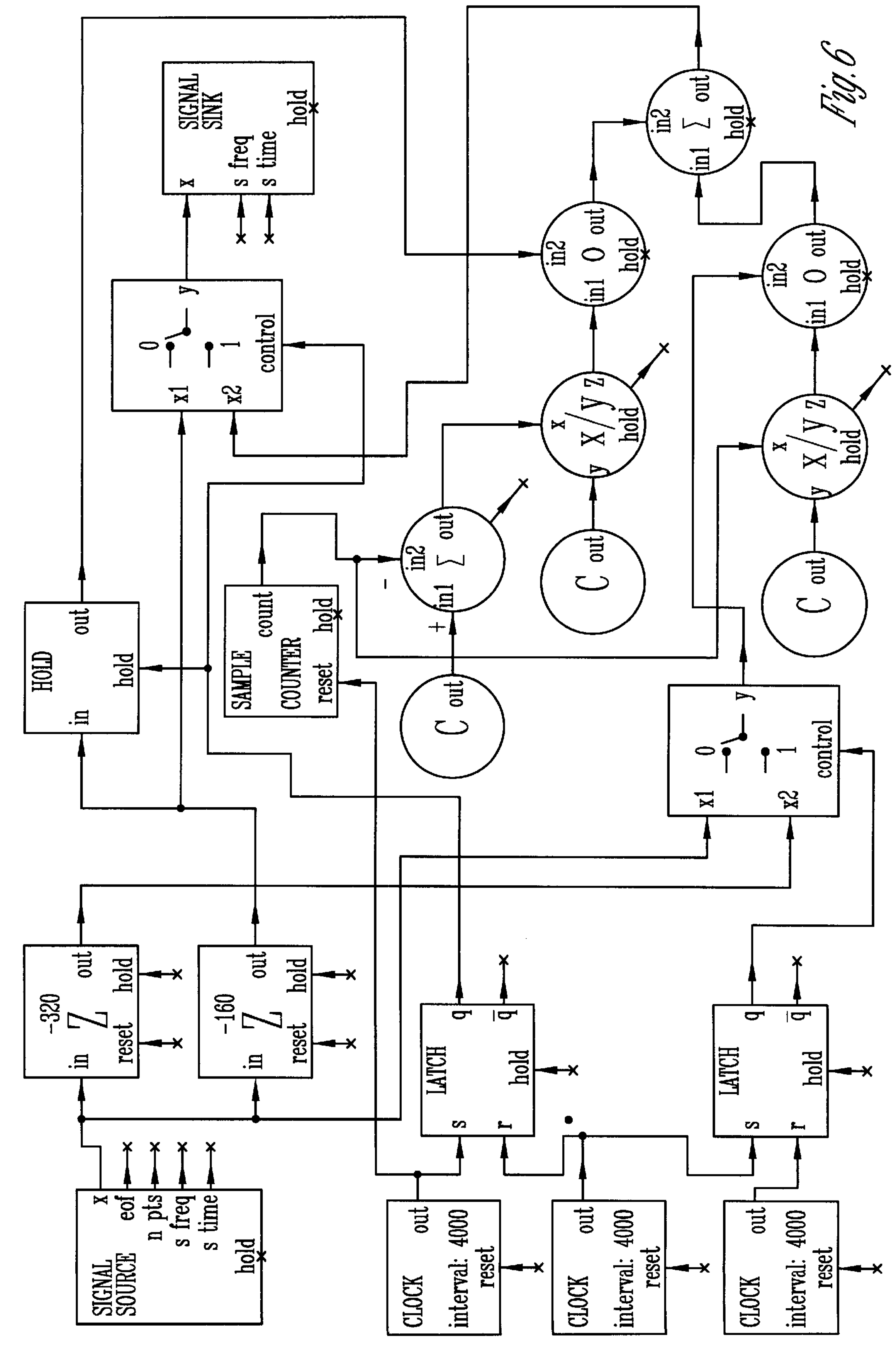
FIG. 6 is a schematic diagram of a software simulation of an embodiment of the invention.

FIG. 6 illustrates a software simulation of the embodiment shown and described with respect to FIGS. 1–3.

What is claimed:

1. A method of concealing data bursts in an analog transmitted time multiplexed signal comprising periods of audio and periods of said data bursts comprising: passing said audio in said analog transmitted time multiplexed signal to an output during periods of audio in said signal;

during periods of said data bursts in said signal, passing stored audio to said output therefore replacing at the output said data bursts with audio, the stored audio comprising a portion of the immediately prior audio and a portion of the immediately future audio.

2. The method of claim 1 wherein the stored audio is taken from the set comprising audio immediately prior to a data burst and audio immediately after a data burst.

3. The method of claim 1 wherein the step of replacing at the output said data bursts comprises storing immediately past and future audio samples from the multiplexed signal and replaying the immediately past and future audio samples during each data burst.

4. The method of claim 3 wherein the storage of the immediately past and future audio samples is correlated to the length of a data burst.

5. The method of claim 4 wherein the data bursts are of a length that is generally less than a spoken syllable.

6. The method of claim 3 further comprising constantly replenishing the stored immediately past and future audio samples.

7. A method of concealing data bursts in an analog transmitted time multiplexed signal comprising periods of audio and periods of said data bursts comprising:

replacing a said data burst in said analog transmitted time multiplexed signal with audio samples, one taken from immediately prior to the data burst and one taken from immediately after the data burst.

8. The method of claim 7 wherein the step of replacing at the output a data burst comprises storing immediately past future audio samples in the multiplexed signal and replaying the immediately past and future audio samples during the data burst.

9. The method of claim 7 further comprising utilizing a weighting function to smooth transitions caused by the replacing step.

10. An apparatus for concealing data bursts in the output signal of a descrambler of an analog transmitted time multiplexed signal comprising periods of scrambled audio and periods of said data bursts comprising:

a first storage buffer which holds successively iterated time delayed audio samples of said analog transmitted time multiplexed signal;

a second storage buffer which holds successively iterated time delayed audio samples of said signal, the time delay exceeding that of the first storage buffer;

first and second switching devices;

a first signal pathway from the first storage buffer, to the first switching device and to an output;

a second signal pathway from the second storage buffer to the second switching device to the first switching device and to the output;

a third signal pathway from said signal to said second switching device to said first switching device to the output;

a control device to control said and second switching devices between said first, second and third signal pathways;

so that in a first state, the first signal path is presented, until at or near the arrival of a data burst, at which time a second state of the second signal path is presented which repeats a portion of non-data burst signal, after which a third state of the third signal path is presented which pre-plays a portion of non-data burst signal, to conceal the whole data burst from the output.

11. The apparatus of claim 10 further comprising a latch connected to each control device.

12. The apparatus of claim 10 further comprising a time delay device to delay operation of each switch for a preselected time.

13. An apparatus to conceal data bursts in an analog audio waveform with periodic data bursts of a length in an analog descrambler comprising:

an input to receive the said analog audio waveform and an output to transfer the waveform to a speaker;

a switching device having a three states, a first state to select and pass those portions of the waveform without periodic data bursts to the output, a second state to select and pass a repeated portion of the waveform in replacement of a portion of the data burst, and a third state to select and pass a pre-played portion of the waveform in replacement of another portion of the data burst;

a control device connected to the switching device to control said three states of the switching device, so that repeated and pre-played portion of the waveform and not a data burst are sent to output during a data burst.

14. A method of suppressing encoded data bursts in an otherwise unencoded analog signal comprising:

passing unencoded portions of the analog signal to an output;

replacing data bursts with samples of the unencoded analog signal, one sample taken from immediately prior to the data burst and one sample taken from immediately after the data burst.

* * * * *